United States Patent
Catalano et al.

(10) Patent No.: US 10,098,492 B2
(45) Date of Patent: Oct. 16, 2018

(54) JUICING DEVICE FOR AGRICULTURAL PRODUCTS SUCH AS CITRUS FRUITS AND THE LIKE

(71) Applicant: A.A.T. AGROINDUSTRY ADVANCED TECHNOLOGIES S.P.A., Catania (IT)

(72) Inventors: Marcello Nunzio Catalano, Catania (IT); Salvatore Maria Vittorio Torrisi, Catania (IT)

(73) Assignee: A.A.T. AGROINDUSTRY ADVANCED TECHNOLOGIES S.P.A., Catania (IT)

( * ) Notice: Subject to any disclaimer, the term of this patent is extended or adjusted under 35 U.S.C. 154(b) by 130 days.

(21) Appl. No.: 14/909,717

(22) PCT Filed: Jul. 30, 2014

(86) PCT No.: PCT/EP2014/066371
§ 371 (c)(1),
(2) Date: Feb. 2, 2016

(87) PCT Pub. No.: WO2015/014891
PCT Pub. Date: Feb. 5, 2015

(65) Prior Publication Data
US 2016/0183708 A1      Jun. 30, 2016

(30) Foreign Application Priority Data

Aug. 2, 2013   (IT) ............................... BO2013A0436

(51) Int. Cl.
A47J 19/02         (2006.01)
(52) U.S. Cl.
CPC .................................... *A47J 19/02* (2013.01)

(58) Field of Classification Search
CPC ....................................................... A47J 19/02
(Continued)

(56) References Cited

U.S. PATENT DOCUMENTS 2,270,007 A      1/1940  McKinnis
4,974,505 A *   12/1990  Torrisi ................... A23N 1/003
                                                                 221/265
(Continued)

FOREIGN PATENT DOCUMENTS

CN      101516215 A     8/2009
CN      103082865 A     5/2013
(Continued)

OTHER PUBLICATIONS

International Search Report dated Oct. 8, 2014 re: Application No. PCT/EP2014/066371; pp. 1-4; citing: GB 2 216 784 A, FR 2 836 016 A1, US 2007/074630 A1, and EP 0 559 260 A1.
(Continued)

*Primary Examiner* — Ibrahime A Abraham
*Assistant Examiner* — John J Norton
(74) *Attorney, Agent, or Firm* — Cantor Colburn LLP (57) ABSTRACT

A juicing device for agricultural products of the type of citrus fruits and the like including at least one transfer rotor and at least one juicing rotor. The transfer rotor rotate about a first rotation axis and is provided externally with at least one seat for at least partial accommodation of at least one portion of an agricultural product, of the type of citrus fruits and the like. The at least one juicing rotor can rotate about a second rotation axis, which is parallel to the first axis. During respective useful portions of the rotation of the at least one seat and of the juicing rotor, the latter penetrates at least partially in the at least one seat, for the juicing of at least one portion of the agricultural product accommodated in the seat.

8 Claims, 11 Drawing Sheets

(58) Field of Classification Search
USPC .......................................................... 99/510
See application file for complete search history.

(56) References Cited

U.S. PATENT DOCUMENTS

| | | | | |
|---|---|---|---|---|
| 5,123,567 | A * | 6/1992 | Anderson | A23N 1/003 |
| | | | | 221/192 |
| 5,170,699 | A * | 12/1992 | Senalada | A23N 1/003 |
| | | | | 99/504 |
| 5,199,348 | A * | 4/1993 | Cimenti | A23N 1/003 |
| | | | | 100/125 |
| 2007/0041268 | A1 * | 2/2007 | Beesley | A47J 43/0716 |
| | | | | 366/195 |
| 2007/0074630 | A1 | 4/2007 | Mengual | |
| 2007/0125244 | A1 * | 6/2007 | Hensel | A47J 19/02 |
| | | | | 99/501 |
| 2009/0301318 | A1 * | 12/2009 | Torrisi | A23N 1/003 |
| | | | | 99/503 |
| 2014/0144926 | A1 * | 5/2014 | Wolf | A47J 47/01 |
| | | | | 222/241 |

FOREIGN PATENT DOCUMENTS

| | | |
|---|---|---|
| EP | 0559260 A1 | 9/1993 |
| FR | 2836016 A1 | 8/2003 |
| GB | 2216784 A | 10/1989 |

OTHER PUBLICATIONS

Written Opinion dated Oct. 8, 2014 re: Application No. PCT/EP2014/066371; pp. 1-5; citing: GB 2 216 784 A, FR 2 836 016 A1, US 2007/074630 A1 and EP 0 559 260 A1.

* cited by examiner

JUICING DEVICE FOR AGRICULTURAL PRODUCTS SUCH AS CITRUS FRUITS AND THE LIKE

TECHNICAL FIELD

The present disclosure relates to a juicing device for agricultural products such as citrus fruits and the like.

BACKGROUND

As is known, the juicing of oranges, lemons, grapefruits and other citrus fruits in order to be able to enjoy their juice, drunk on its own (and/or with sugar or water) or as an ingredient for cocktails and other beverages, is very widespread.

In order to be able to perform such juicing, it is therefore possible to proceed manually, by gripping each half of the citrus fruit, cut beforehand, to then compress forcefully its external peel, thus producing the outflow of the juice, which is usually collected in a glass or other container.

In order to speed up and optimize this operation, numerous automatic or semiautomatic devices are known, however, which in various manners are capable of providing the desired juicing and are therefore used widely both for domestic and most of all professional uses (for example in bars, discotheques, restaurants, etc.).

These constructive solutions, however, are not devoid of drawbacks.

Often, in order to be able to arrange inside the covering shell the various elements assigned to juicing, conventional devices are in fact too bulky, and this is evidently not welcomed by users.

Moreover, most commercially available automatic devices are conceived and designed for professional environments and therefore are scarcely suitable for domestic uses (for example for private dwellings), especially due to their costs and to the complex activities for maintenance and cleaning that are periodically required.

Moreover, it must be noted that many conventional constructive solutions are ineffective in managing peels, once juicing has occurred, thus forcing maximum attention on the user to prevent soiling the immediate vicinity and/or unwanted accumulations of the peels.

Last but not least, it should be noted that consumer demand for juicing devices that in addition to meeting the above mentioned requirements are also capable of autonomously performing the preliminary cutting of oranges (so as to be able to feed the device with the whole orange) is increasingly high, this activity being instead often entrusted to the user (or performed by devices that have an even greater complexity and cost and therefore often out of reach for private individuals and not only).

The aim of the present disclosure is to solve the problems described above, by providing a device that is capable of juicing agricultural products such as citrus fruits and the like in a practical and easy manner.

SUMMARY

Within this aim, the disclosure provides a juicing device that is capable of performing inexpensively and easily also the preliminary cutting of the citrus fruit.

The disclosure also provides a juicing device that is compact and capable of managing in an optimum manner the peels once juicing has occurred.

The disclosure further provides a juicing device that is assuredly suitable both for domestic uses and for professional environments.

The disclosure provides a juicing device that is simple to maintain and clean and ensures high reliability in operation.

The disclosure also provides a juicing device that can be obtained easily starting from commonly commercially available elements and materials.

The disclosure further provides a juicing device that has modest costs and is safe in application.

These aims are achieved by providing a juicing device for agricultural products of the type of citrus fruits and the like, wherein it comprises at least one transfer rotor, which can rotate about a first rotation axis and is provided externally with at least one seat for at least partial accommodation of at least one portion of an agricultural product, of the type of citrus fruits and the like, and at least one juicing rotor, which can rotate about a second rotation axis, which is parallel to said first axis, during respective useful portions of the rotation of said at least one seat and of said juicing rotor, said at least one juicing rotor penetrating at least partially in said at least one seat, for the juicing of the at least one portion of the agricultural product accommodated in said seat.

BRIEF DESCRIPTION OF THE DRAWINGS

Further characteristics and advantages of the disclosure will become better apparent from the description of two preferred but not exclusive embodiments of the juicing device according to the disclosure, illustrated by way of nonlimiting example in the accompanying drawings, wherein:

FIGS. 1 to 9 are views of the juicing device according to the disclosure in the first embodiment, more particularly:

FIG. 4 is a top view of the device of FIG. 2;

FIGS. 10 to 17 are views of the juicing device according to the disclosure in the second embodiment, more particularly:

DETAILED DESCRIPTION OF THE DRAWINGS

With particular reference to the figures, the reference numeral 1 generally designates a juicing device for agricultural products A such as citrus fruits and the like.

It is specified in fact right now that in the preferred application the device 1 is intended to juice oranges (especially), lemons, grapefruits and other citrus fruits, and therefore constant reference shall be made to this use in the continuation of the present description; however, it is not excluded to resort to the device 1 according to the disclosure to juice other agricultural products A if the circumstances allow it and/or make it preferable.

For example, in fact, and without in any case exhausting the possibilities of use of the device 1 according to the disclosure, the device can be used to juice agricultural products A such as pomegranates or more generally any whole or precut spheroidal fruit without a stone (mangoes, apples, etc.).

According to the disclosure, the device 1 comprises a transfer rotor 2, which can rotate about a first rotation axis C and is provided externally at least with one seat 3 for the at least partial accommodation of at least one portion B of the agricultural product A, such as citrus fruits and the like.

Moreover, the device 1 comprises at least one juicing rotor 4, which can rotate about a second rotation axis D, which is parallel to the first axis C.

During respective useful portions of the rotation of the seat 3 and of the juicing rotor 4, said rotor penetrates at least partially in the seat 3, compressing the portion B of the agricultural product A (for example the orange) accommodated therein; the two rotors 2, 4 behave in practice like complementary profiles and thus provide the desired juicing of the orange.

Figure 3:
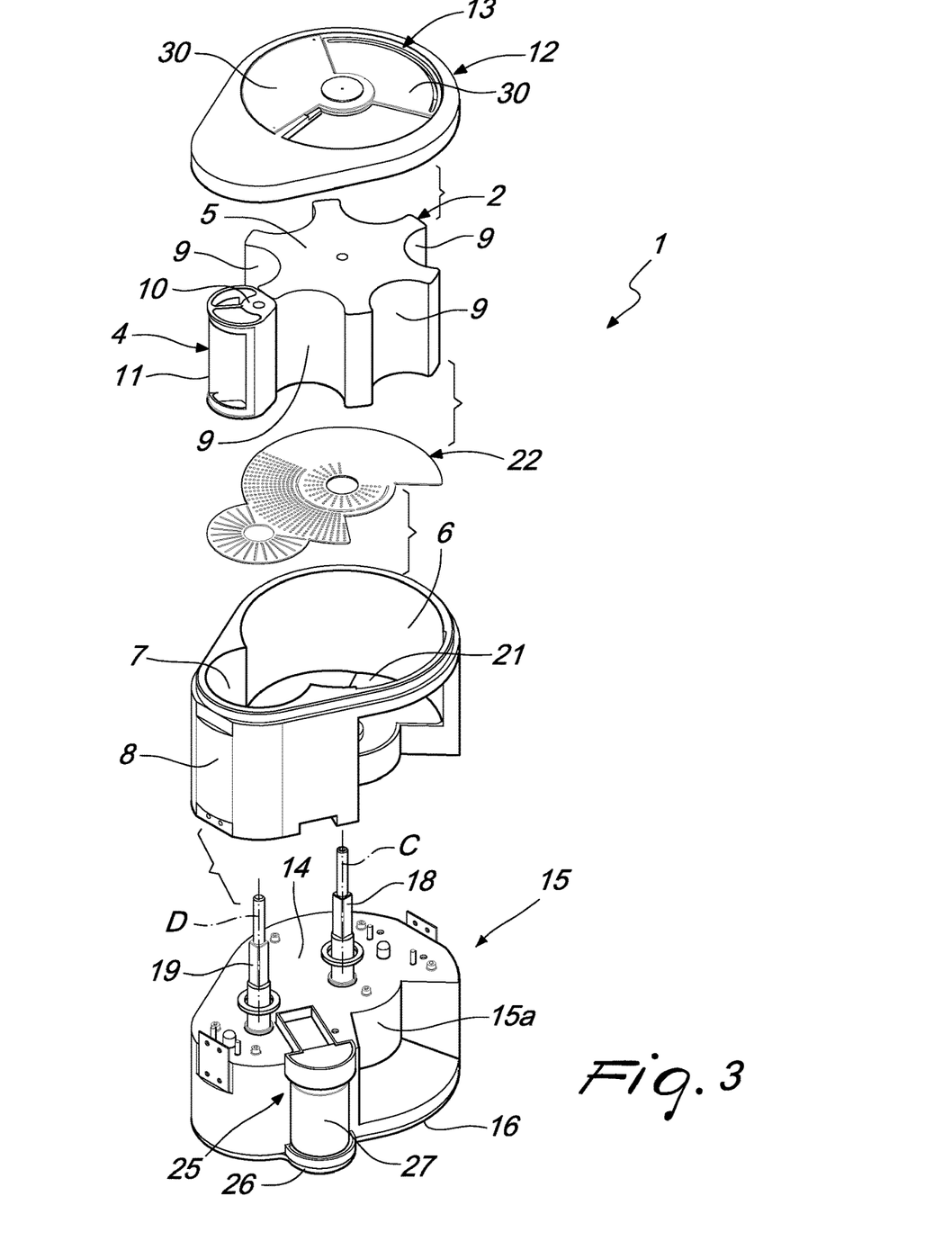
FIG. 3 is an exploded perspective view of the device according to the disclosure.
Figure 8:
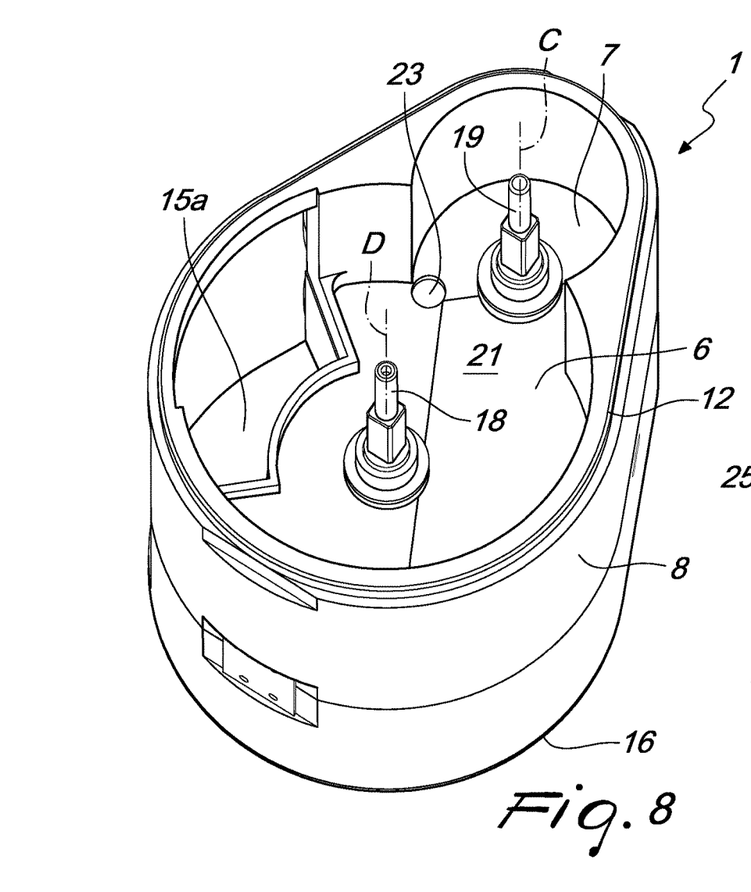
FIG. 8 is another perspective view of the device according to the disclosure and deprived of some elements.
Figure 9:
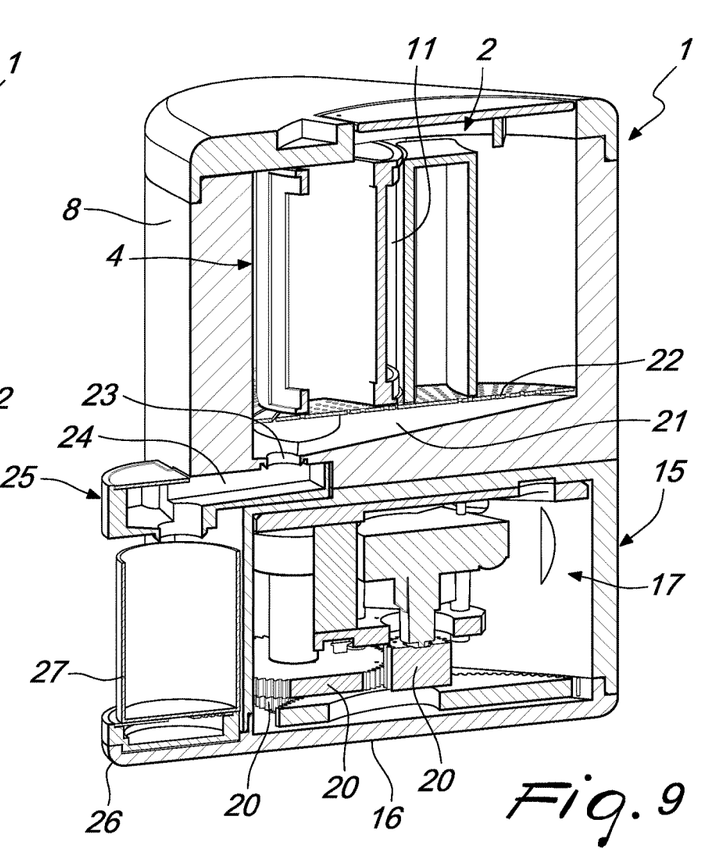
FIG. 9 is a sectional perspective view of the device according to the disclosure, taken along a plane that is parallel to the rotation axes.
Figure 11:
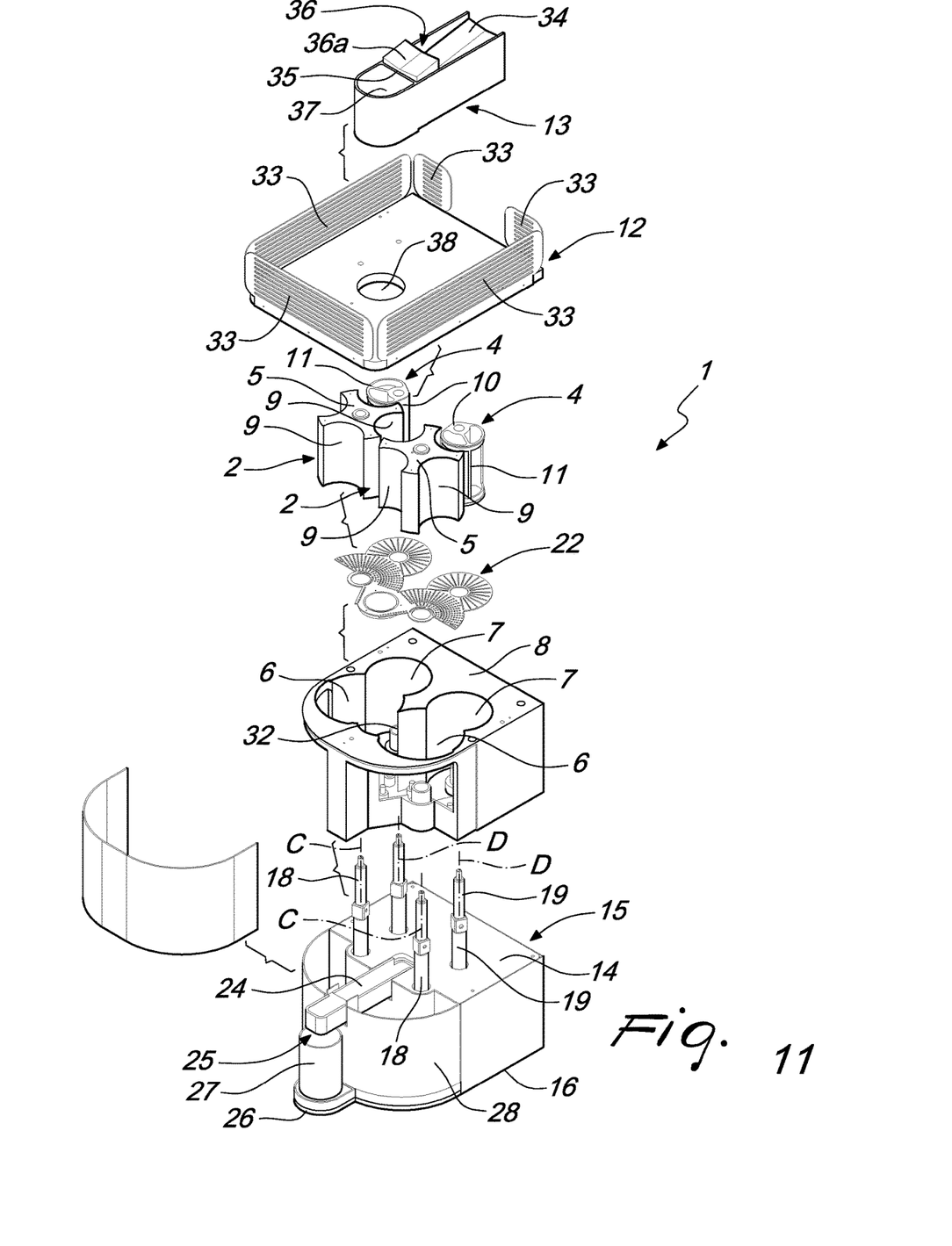
FIG. 11 is an exploded perspective view of the device according to the disclosure.

In particular, in a constructive solution of considerable practical interest, proposed by way of nonlimiting example of the application of the disclosure, the transfer rotor 2 is constituted substantially by a cylinder 5 that is accommodated rotatably in at least one respective first substantially cylindrical chamber 6, which is open toward the juicing rotor 4 (in turn accommodated in a second chamber 7, which is indeed connected to the first chamber 6); both the first chamber 6 and the second chamber 7 are defined in a casing 8 (as shown clearly for example in FIGS. 3, 8 and 11).

As can be seen from the accompanying figures, the transfer rotor 2 preferably has a plurality of axial slots that are evenly distributed along its lateral surface and extended along the entire length of the cylinder 5. Each slot has a substantially semicylindrical delimiting surface 9, so as to define (with the first chamber 6) a respective accommodation seat 3 for a hemispherical portion B of the agricultural product A, cut beforehand, which therefore arranges itself in said seat 3 with the peel E directed toward the delimiting surface 9 and the pulp, at the cutting area, directed externally (so that it can be compressed by the juicing rotor 4 at the useful portion of rotation), as clearly visible for example in FIGS. 4, 12 and 13.

Merely by way of illustration of a possible constructive solution, which does not limit in any way the application of the disclosure, each seat 3 has a length of 136 mm and a radius of 45 mm, thus being adapted to accommodate oranges and similar citrus fruits.

With further reference to the constructive solution introduced above, illustrated in the accompanying drawings by way of nonlimiting example, the juicing rotor 4 is constituted substantially by a prism-like body 10, which has at least one useful sector 11 of its lateral surface that has a substantially cylindrical shape and is eccentric with respect to the second rotation axis D.

In this manner, at the useful portion, the sector 11 (conveniently perforated, so as to define a plurality of filtering openings) enters the respective seat 3, in order to expel the hemispherical portion B of the agricultural product A.

Figure 14:
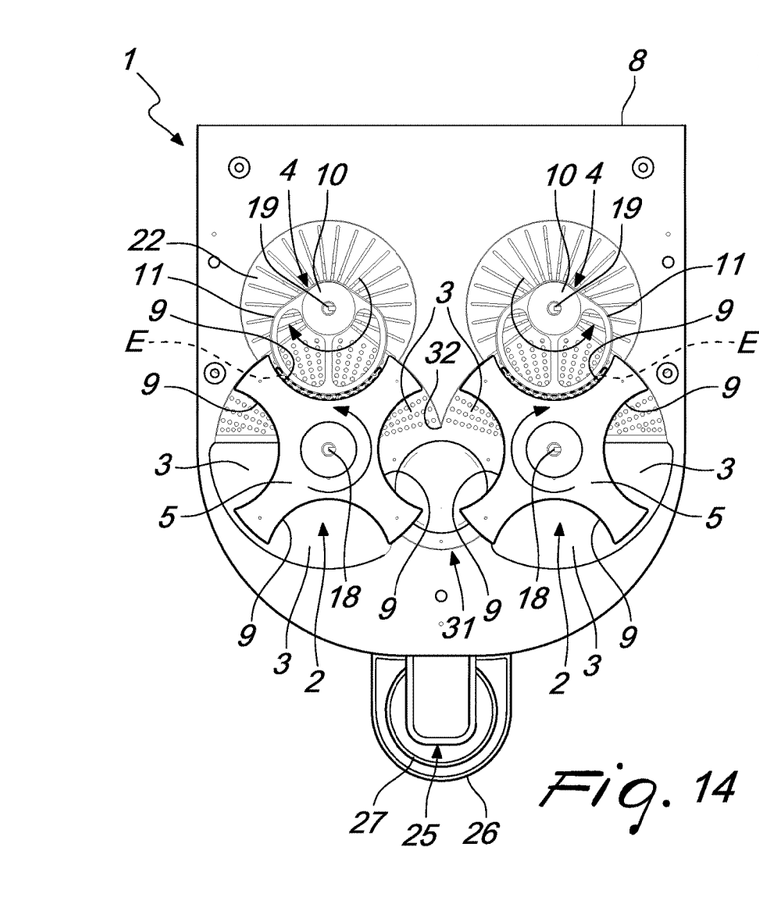
Figure 15:
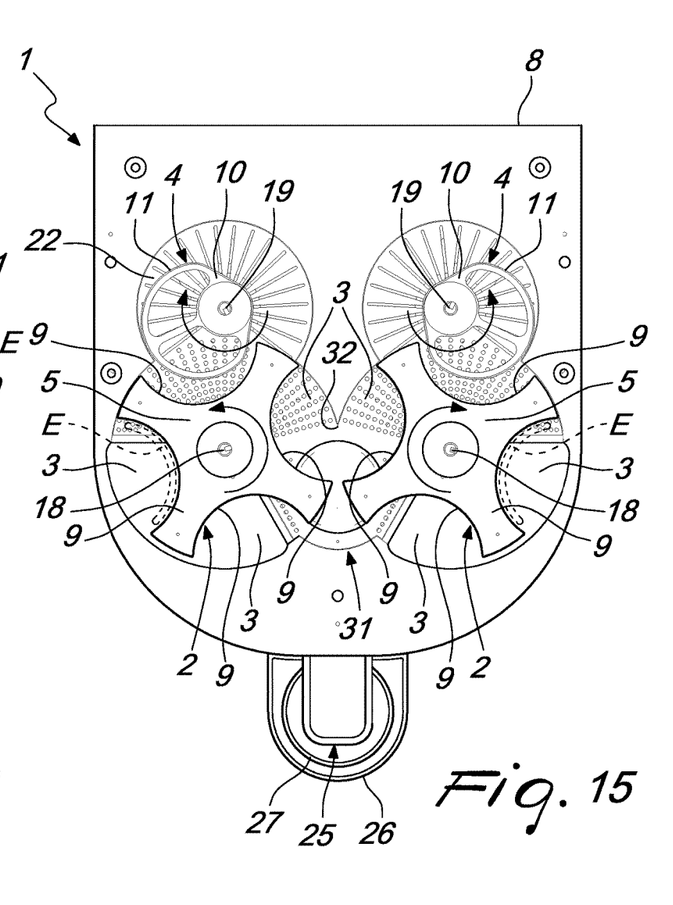

As can be seen from the accompanying figures, it can be noted that the curvature of the sector 11 is selected so as to correspond substantially to the curvature of the delimiting surface 9 of the seat 3; in this manner, when, at the respective useful portions, the sector 11 of the juicing rotor 4 enters the seat 3, said seat reduces itself to an interspace of minimal size (as in FIG. 14), capable in practice of accommodating only the peel E of the agricultural product A, thus ensuring optimum juicing.

It is convenient to specify that it is possible to provide the transfer rotor 2 with a number of slots (and therefore of seats (3)) at will, for example six (as in the embodiment proposed in FIGS. 1 to 9) or four (as in the embodiment proposed in FIGS. 10 to 17), and likewise it is not excluded to provide juicing rotors 4 optionally provided with two or more useful sectors 11.

Moreover, the above cited scope includes devices 1 provided with a number at will of transfer rotors 2 and/or of juicing rotors 4 (for example, merely by way of illustration, the embodiment of FIGS. 1 to 9 proposes a device 1 that comprises a transfer rotor 2 and a juicing rotor 4, while the embodiment of FIGS. 10 to 17 provides for two transfer rotors 2 and two juicing rotors 4).

According to the preferred constructive solution, illustrated in the accompanying figures by way of nonlimiting example of the application of the disclosure, the casing 8 comprises an upper cover 12, provided with means 13 for inserting at least one portion B of the agricultural product A, while, at the opposite end, the casing 8 is arranged detachably on the upper face 14 of a substantially boxlike footing 15. The footing 15 furthermore has a lower face 16, which can be arranged on a resting surface (a table, a shelf, a counter of a bar, et cetera).

Inside the footing 15, as can be deduced for example from FIGS. 9, 11, 16 and 17, a motor apparatus 17 is accommodated for a first rotating shaft 18 and for a second rotating shaft 19.

The above cited rotating shafts 18, 19 are extended externally (upwardly) respectively along the first rotation axis C and the second rotation axis D (see for example FIGS. 3 and 11), at right angles to the faces 14, 16 of the footing 15 (and therefore to the resting surface), in order to support correspondingly the transfer rotor 2 and the juicing rotor 4, detachably coupled to the shafts 18, 19 (the reasons for the choice, which is preferred but not exclusive, to resort to a detachable coupling between the rotors 2, 4 and the corresponding shafts 18, 19 will become better apparent in the continuation of the present description).

It should be noted therefore that after placing the device 1 on the selected resting surface, therefore at the location and point of use, the rotors 2, 4, preset to transfer and juice the oranges (or other citrus fruit), rotate about axes C, D that are arranged vertically.

According to a possible constructive choice, which does not limit the application of the disclosure, the apparatus 17 can comprise a gearmotor, which moves a plurality of gears 20, which mesh with each other and are associated with the rotating shafts 18, 19 so as to turn them (and the rotors 2 and 4 with them) according to the desired rule of motion.

For example, therefore, it is possible to select gears 20 such as to impart, for the embodiment of FIGS. 1 to 9, a rotation rate of the juicing rotor 4 that is equal to six times the rotation rate of the transfer rotor 2 (or four times, in the case of the embodiment of FIGS. 10 to 17), so that upon each full turn of each transfer rotor 2, the juicing rotor (which is faster) is capable of performing a number of complete rotations that matches the number of seats 3 provided on the respective transfer rotor 2.

In any case, the possibility is not excluded to provide the device 1 according to the disclosure with various motor apparatuses 17 (or also to market devices 1 according to the disclosure in which the movement of the rotors 2, 4 is entrusted to an operator, by means of an adapted crank), as a function of the specific requirements.

Advantageously, the casing 8 is provided in a lower region with an internal tank 21, which in practice rests against the upper face 14 of the footing 15 and is arranged below at least the juicing rotor 4. The tank 21 is thus capable of collecting the liquid expelled from the hemispherical portions B of the agricultural products A and filtered by way of the openings provided in the useful sector 11.

Furthermore, a contoured grille 22 for further filtration of the expelled liquid is interposed between the rotors 2, 4 and the tank 21, lies above the tank 21 and is parallel thereto.

Therefore, in normal operation, when the juicing rotor 14 enters with its useful sector 11 the respective seat 3, the liquid that is expelled from the portion B of the orange penetrates the openings (usually, appropriately provided microperforations) of the useful sector 11 and therefore enters the prismatic body 10. From there, by gravity, the liquid falls toward the collection tank 21, and before reaching it is further filtered by the grille 22, thus preventing any seed or other solid waste (for example pulp) from remaining mixed with the juice and thus ensuring optimum juicing.

In order to be able to manage easily the juiced liquid, along the bottom of the tank 21 there is a manifold 23 (into which the liquid is directed, by way of the appropriately inclined floor of the tank 21), which is connected to a duct 24 for the discharge of the liquid, provided in a dispensing spout 25, which can also be extractable (to allow easy washing and cleaning) and is directed outwardly.

Indeed to facilitate further the collection of the juiced liquid, below the protruding end flap of the spout 25 the footing 15 can form an external platform 26, on which a glass 27 (or other freely removable container) rests.

Positively, the footing 15 is provided externally with at least one recess 15a, which is arranged below the transfer rotor 2 at a return portion of the slots that is subsequent to the useful portion during their rotation about the first rotation axis C.

In this manner, when the transfer rotor 2 continues its stroke, after juicing, which occurs as noted at the useful portion, the peels E and any other waste obtained as a consequence of juicing the hemispherical portions B of the agricultural products A can fall into at least one collection drawer 28, which is accommodated removably in the recess 15a (from which it can be removed periodically and temporarily in order to empty it).

Positively, in the embodiment proposed in FIGS. 1 to 9 merely by way of illustration, the insertion means 13 comprise at least one inlet 29 that is shaped like an annular portion and is provided in the upper cover 12 coaxially to the transfer rotor 2 and to the first rotation axis C.

Figure 4:
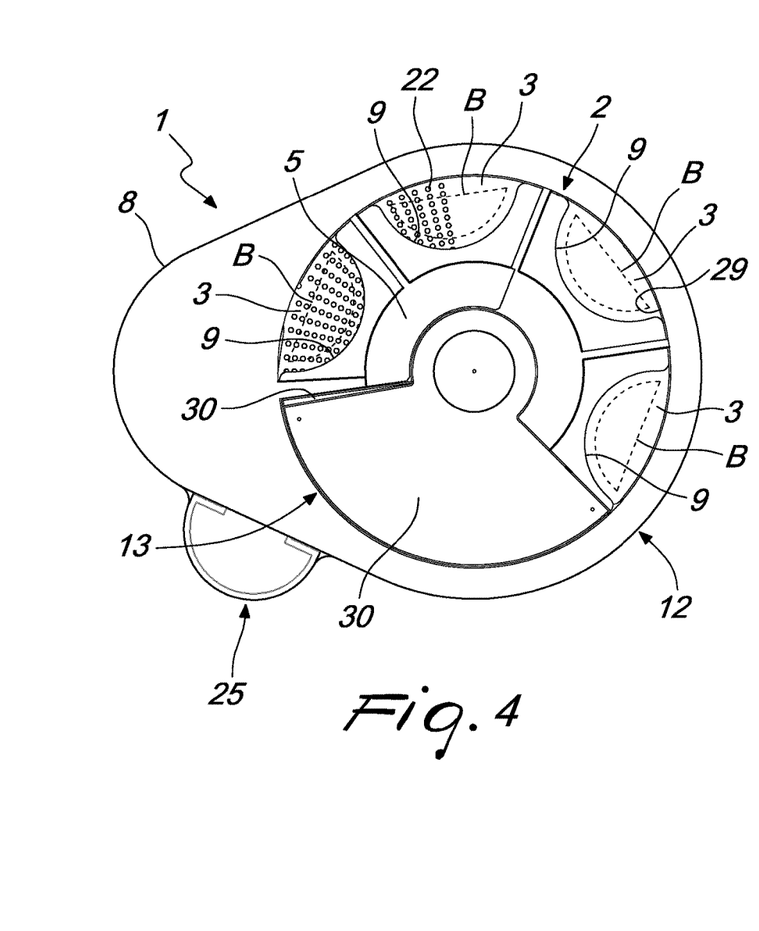
Figure 5:
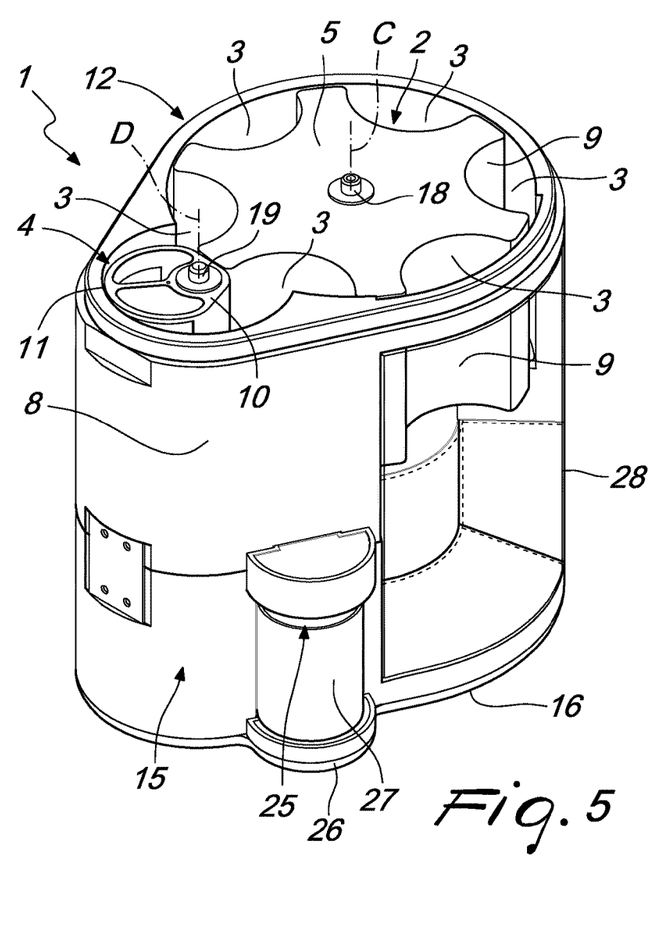
FIGS. 5 to 7 are views of the device according to the disclosure, progressively deprived of some components.
Figure 6:
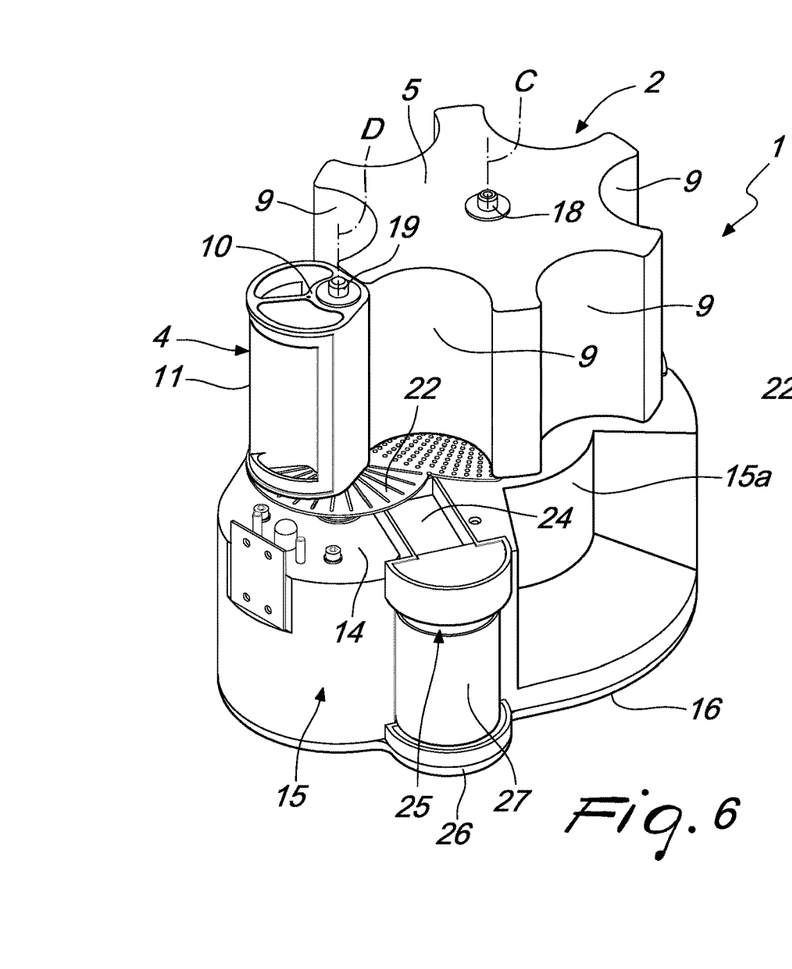
Figure 7:
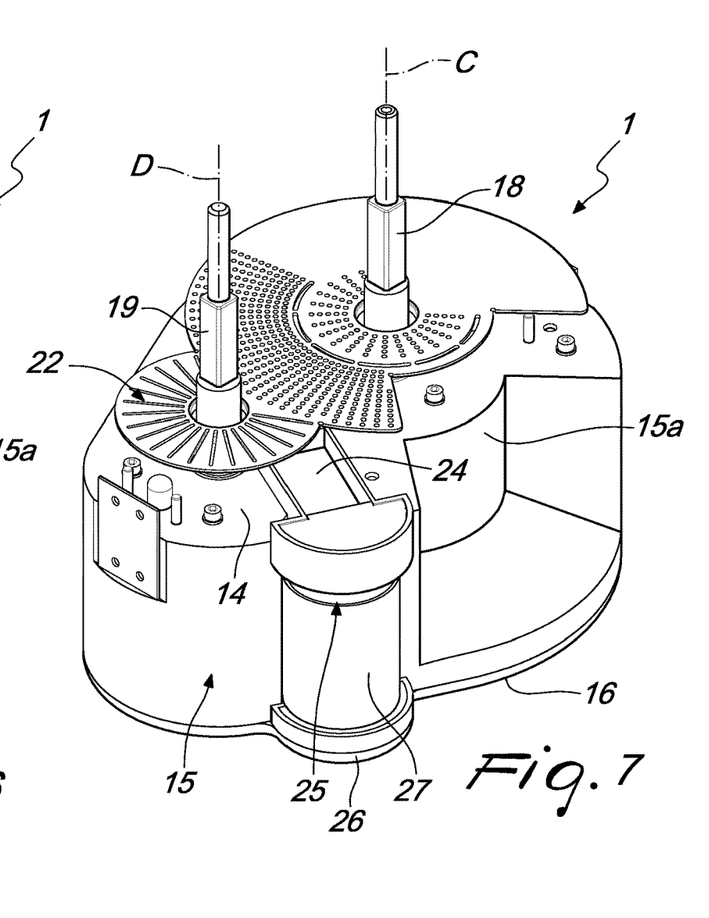

The inlet 29 faces at least one respective slot (and for example four slots, as in the embodiment proposed in the cited FIGS. 1 to 9 and as clearly visible in FIG. 4), at at least one angular feeding position.

Through the inlet 29 it is therefore possible to feed the device 1 with four hemispherical portions B (obtained from the preliminary cutting of two oranges or other citrus fruit), which are thus accommodated by the user in the respective seats 3.

The inlet 29, moreover, can be closed at least partially (to prevent the danger of penetration of dirt within the device 1 and/or to protect the user against the danger of coming into contact with the rotors 2, 4 during operation) by at least one fan-shaped door 30, which also rotates about the first rotation axis C.

More particularly, the accompanying figures propose a solution that provides resorting to two doors 30 that can overlap, each of which is capable of closing one half of the inlet 29: during the rotation of the rotors 2, 4, the two doors 30 are substantially laterally adjacent (as in FIG. 1), closing completely the inlet 29 and thus preventing completely access to the seats 3 and to the rotors 2, 4.

Vice versa, in order to feed the device 1, the user can rotate the upper door 30, thus exposing partially the inlet 29; when, during rotation, the upper door 30 is superimposed on the lower one, it entrains it, thus obtaining, if one continues with the rotation, the complete opening of the inlet 29 (as in FIGS. 2 and 4), thus allowing the user to insert in each of the four seats 3 that at that moment face the inlet 29 a respective hemispherical portion B (cut beforehand) of an orange.

Figure 1:
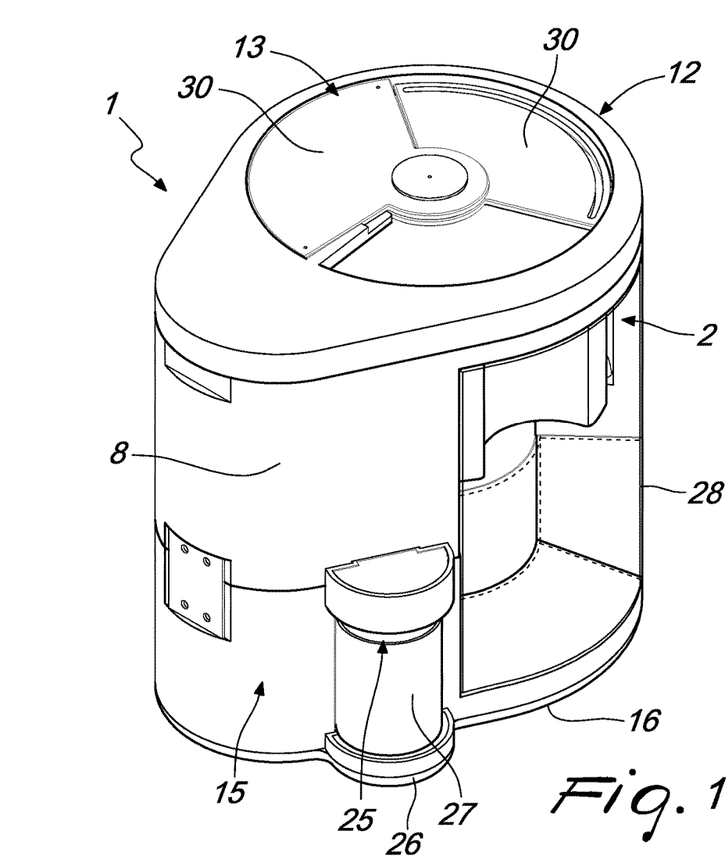
FIGS. 1 and 2 are perspective views of the device according to the disclosure in two different positions of an upper covering element.
Figure 2:
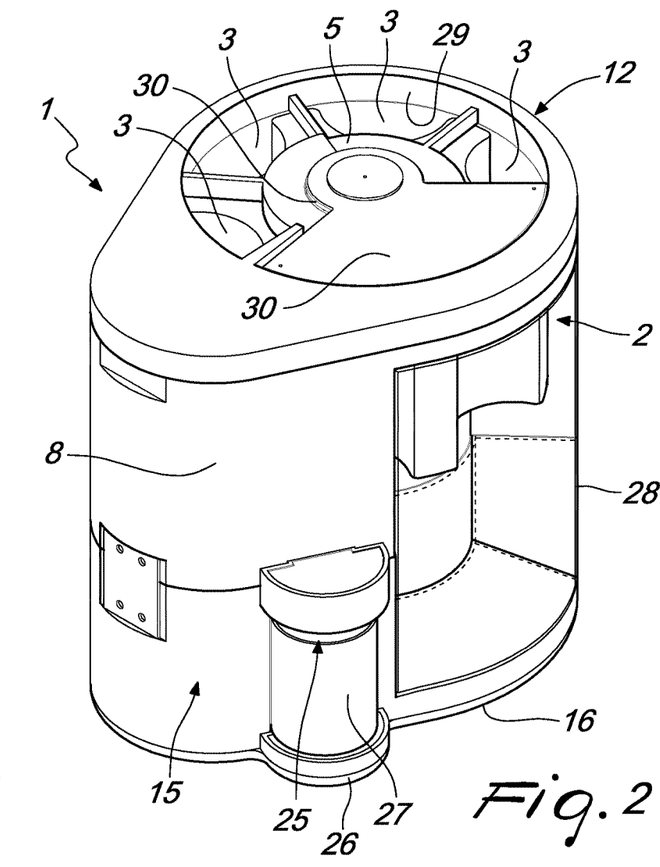

Obviously, in order to proceed with juicing, the user can again rotate the doors 30, returning them to the arrangement of FIG. 1 and thus beginning the extraction of the juice from the four portions B and therefore in practice from two oranges.

Conveniently, in order to relieve the user from the task of cutting the oranges beforehand (and therefore allow him to feed the device 1 with whole agricultural products A), the device 1 can comprise an element for the automatic cutting of the whole agricultural products A in order to obtain the hemispherical portions B.

Figure 12:
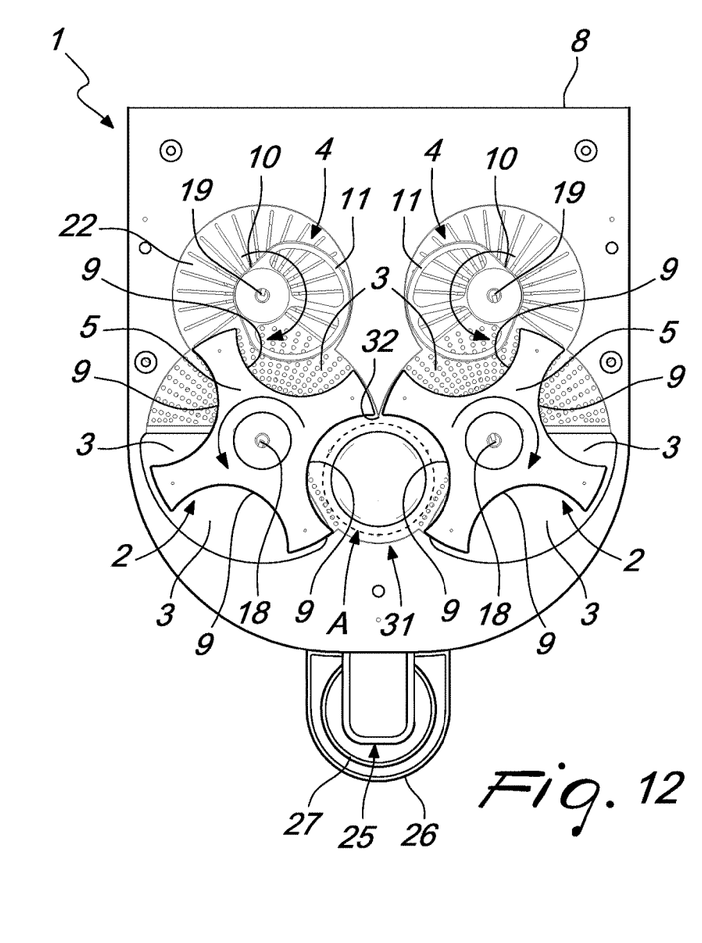
FIGS. 12 to 15 are views of the operation of the juicing device, taken from above and deprived of an upper element.

In particular, in the embodiment proposed in FIGS. 10 to 17 (by way of nonlimiting illustration of the application of the disclosure), the device 1 comprises two transfer rotors 2 (and two juicing rotors 4); at respective first loading positions, each slot of a transfer rotor 2 faces a corresponding slot of the other transfer rotor 2, in order to form temporarily a cylindrical channel 31 (which is visible in FIG. 12 and is indeed constituted by two mutually opposite seats 3), in which it is thus possible to insert and accommodate a substantially spherical whole agricultural product A (also shown in FIG. 12).

Between the transfer rotors 2 there is therefore the cutting element, which in this embodiment is constituted substantially by a blade 32 (which is formed by the internal walls of the casing 8 and in particular of the first chambers 6, as can be seen clearly from FIG. 11, for example).

Figure 13:
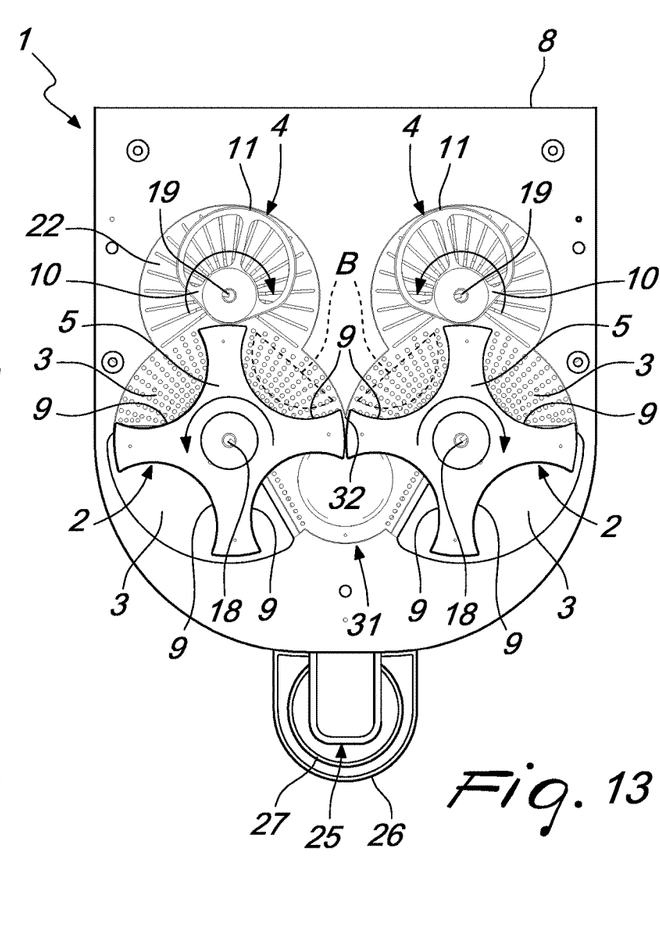

As shown in the accompanying figures, the blade 32 is extended parallel to the rotation axes C, D and is directed toward the channel 31; thus, during the rotation of the seats 3 toward the respective useful portions, in which juicing occurs, the whole agricultural product A is pushed by the transfer rotors 2 toward the blade 32, which can thus cut it automatically into two hemispherical portions B (which, freshly formed, are arranged in the positions of FIG. 13).

Continuing in the rotation, therefore, the juicing rotors 4 enter the respective seats 3 (as in FIG. 14) and then the transfer rotors 2 convey the peels E above the drawers 28 (as in FIG. 15), where they can fall.

Conveniently, the cover 12 is provided with perimetric side walls 33, which allow defining a sort of storage tank for the whole agricultural products A (which are thus immediately available when one wishes to proceed with juicing), prior to their insertion in the channel 31.

As shown in FIGS. 10, 11, 16 and 17, in this embodiment the insertion means 13 comprise a chute 34, which is arranged on the cover 12, is inclined toward the channel 31 and is controlled by a blocking partition 35.

Figure 16:
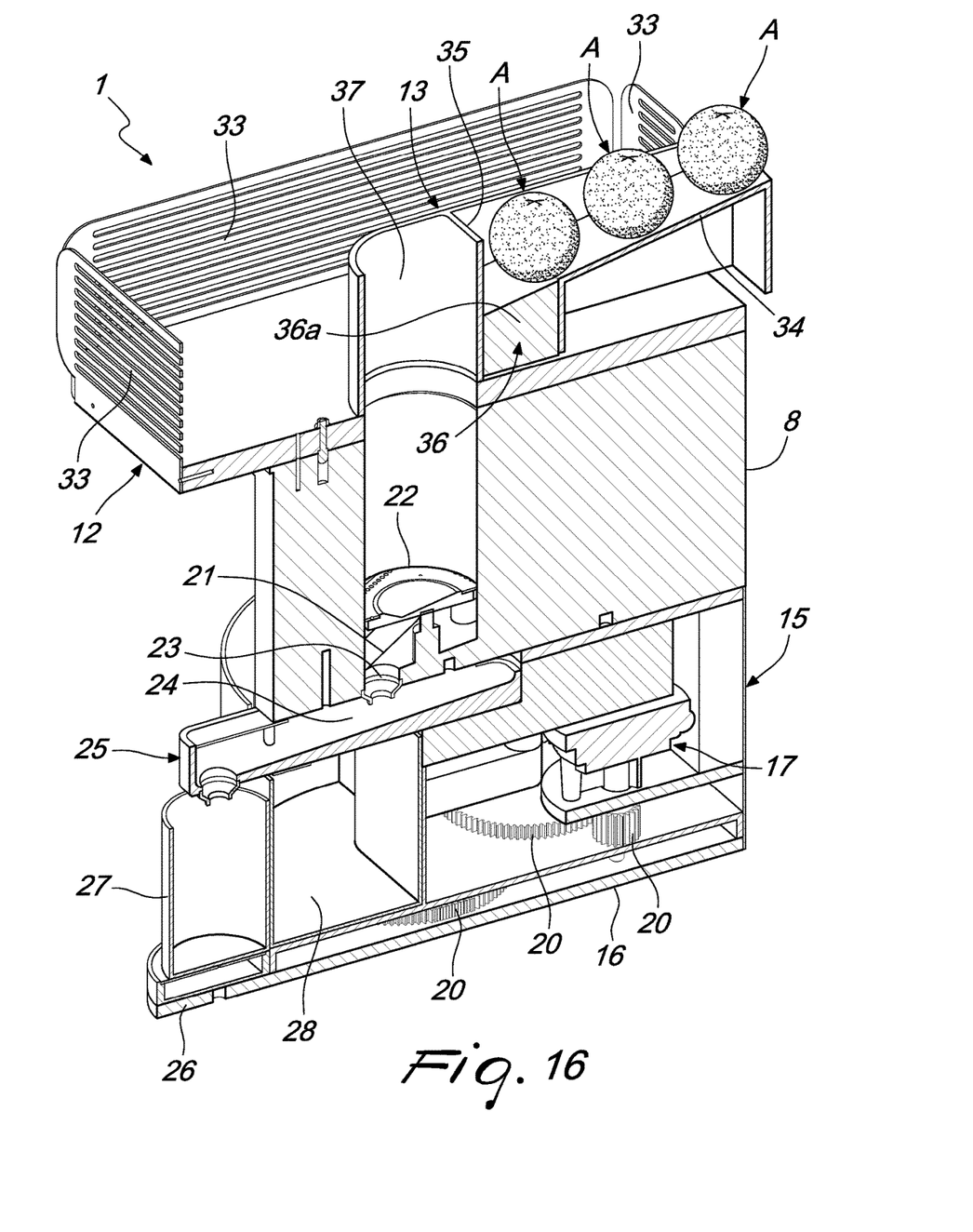
FIGS. 16 and 17 are perspective sectional views of the device according to the disclosure, taken along a plane that is parallel to the rotation axes, and show the operation of some additional components.

The presence of the partition 35 allows to preload onto the chute 34 one or more oranges (or other agricultural product A), as for example in FIGS. 16 and 17, preparing them for their entry into the channel 31, which occurs in the manner described hereinafter.

Figure 10:
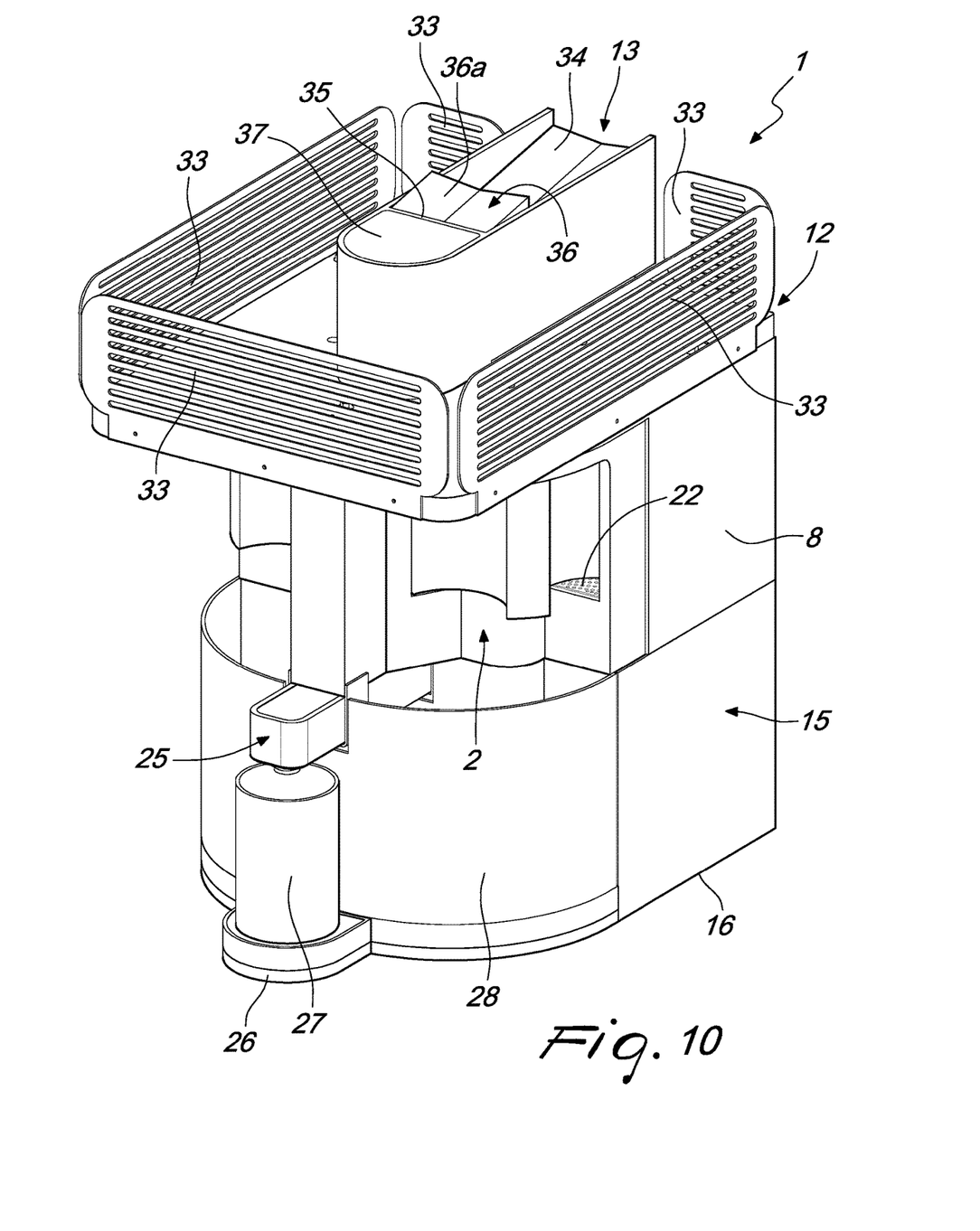
FIG. 10 is a perspective view of the device according to the disclosure.
Figure 17:
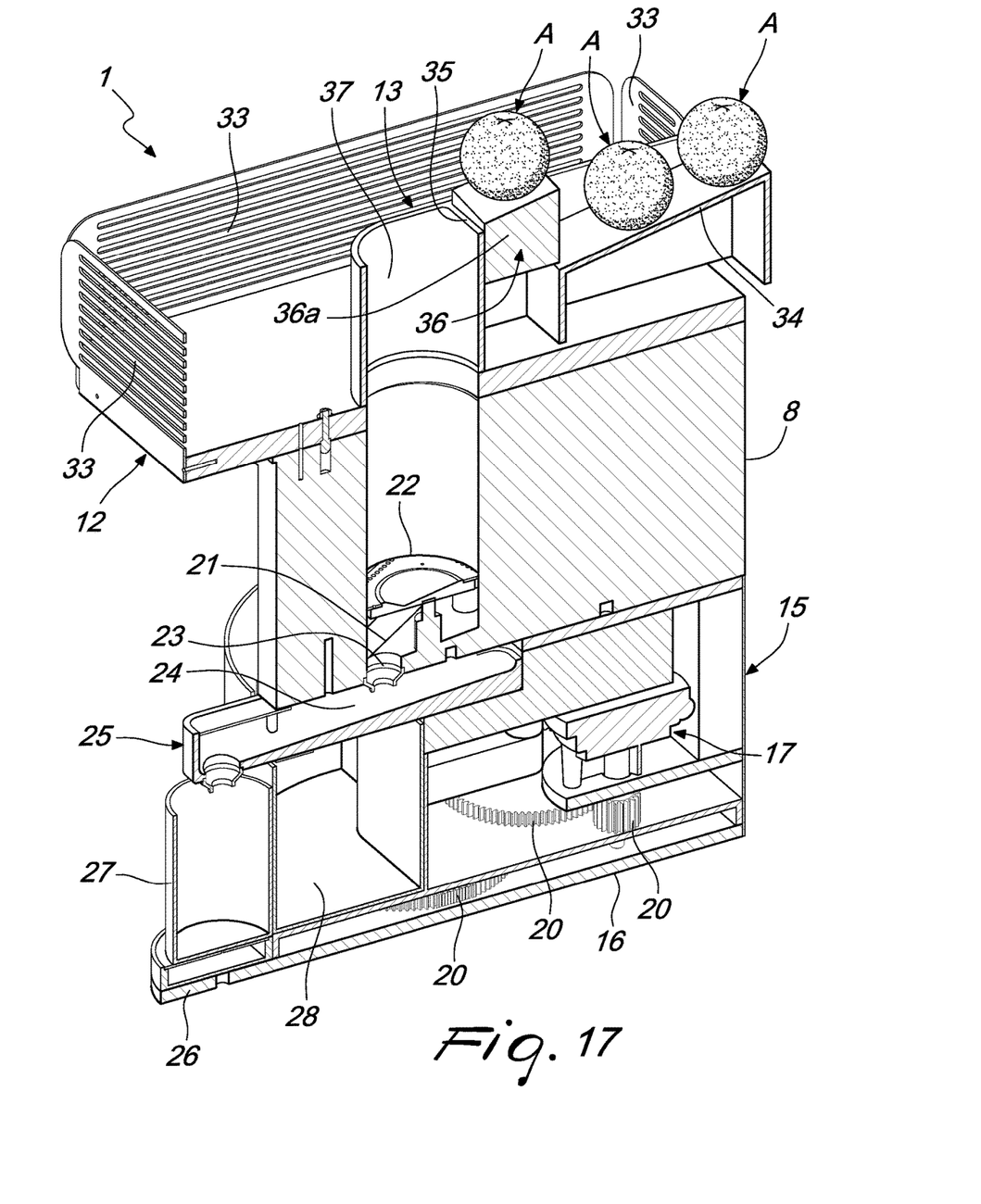

Due to the slope of the chute 34, obviously the oranges tend to roll toward the partition 35, which stops them; between the partition 35 and the chute 34, therefore, a lifting block 36 is interposed which can move between a first (inactive) configuration, in which the top 36a of the block 36 is aligned with the chute 34 (and in which it is shown for example in FIG. 16), and a second configuration (in which the block 36 is shown in FIGS. 10, 11 and 17), wherein the top 36a is raised to a vertical height that is greater than the height of the partition 35, and vice versa.

Thus, the agricultural product A loaded onto the top 36a (conveniently inclined) can go beyond the partition 35 and fall into the channel 31 through an opening 37, which is laterally adjacent to the partition 35 and is aligned with the channel 31.

When the block 36 is raised in the second configuration, it acts in turn as a stop element for the next orange.

As can be deduced from FIG. 11, in order to allow the passage of the oranges from the opening 37 to the channel 31, an orifice 38 that is aligned with them is provided in the cover 12.

After the first orange has fallen into the channel 31, the block 36 can descend again and move to the first configuration, so as to allow the next orange to roll onto its top 36a, preparing the device 1 for a new cutting and juicing cycle.

Operation of the juicing device according to the disclosure is as follows.

First of all, as shown, the device 1 can be fed with hemispherical portions B of previously cut oranges or with whole oranges, entrusting to the device 1, which is provided for this purpose with a blade 32, the task of performing cutting automatically.

In any case, the juicing operation occurs by means of the simultaneous rotation of each transfer rotor 2 and of the respective juicing rotor 4. More particularly, juicing is performed by the useful sector 11 of the juicing rotor 4, which enters the seats 3 of the transfer rotor 2 (while the two rotors 2, 4 rotate in the same direction, for example both clockwise, as in the accompanying figures), thus compressing the hemispherical portion B of the agricultural product A (the orange).

In practice, therefore, the useful sector 11 of the juicing rotor 4 and the seat 3 behave like two mutually meshing complementary profiles, ensuring, during rotation, the almost complete occupation of the slot and therefore the complete juicing of the portion B contained therein.

As mentioned, the hemispherical portion B can be introduced directly in the seats 3 by the user, through the inlet 29 and by rotating the doors 30, or can be obtained by means of the cutting of the whole orange (introduced in the channel 31) performed automatically by the blade 32.

While each transfer rotor 2 performs a rotation about its first axis C, the respective juicing rotor 4 can rotate six times (in the embodiment of FIGS. 1 to 9) or four times (in the embodiment of FIGS. 10 to 17) about the second axis D, and therefore enter each seat 3 of the transfer rotor 2 that is functionally associated therewith.

In any case, due to juicing, the juice is pushed into the prism-like body 10 of the juicing rotor 4 (undergoing a first filtration by the useful sector 11 of its lateral surface, which for this purpose is provided with adapted openings).

From the inside of the body 10 of the juicing rotor 4, the liquid precipitates by gravity and, after undergoing a second filtration by means of the contoured grille 22, is collected in the tank 21, by now completely devoid of seeds, pips, pulp or other unwanted elements.

Subsequently, the expelled liquid (the juice) is directed toward the manifold 23 and then into the duct 24 of the spout 25, from which the liquid can thus be dispensed externally (and optionally collected in a glass 27).

Simultaneously, the rotors 2, 4 continue their rotation about the respective axes C, D and therefore the useful sector 11 exits progressively from the seats 3, while each transfer rotor 2 pushes the peels E, which are still obviously present in the respective seats 3 after juicing, beyond the useful portions of rotation (in which indeed juicing occurs), until they are brought above the drawers 28, into which the peels E can be discharged automatically, clearing the seats 3 and making them available for a new cycle.

The device 1 therefore allows to provide in a practical and easy manner the juicing of one or more oranges (or other citrus fruit), optionally also performing automatically the preliminary cutting thereof and then collecting the juice in a glass 27 already ready for use.

This result is obtained with a constructive solution that is simple, inexpensive, compact (the choice to resort to the doors 30 allows to contain in an optimum manner also the height of the device 1) and therefore particularly suitable for private dwellings or small commercial concerns, but obviously assuredly appreciated also for other professional uses (optionally also in the version provided with the cutting element, be it constituted by the blade 32 or others).

With reference to the solution proposed in FIGS. 1 to 9, it is convenient to note that it allows to juice in a single loading operation four hemispherical portions B and therefore no less than two oranges (differently from what occurs with conventional devices, which juice only one).

Moreover, as shown clearly in FIGS. 3 and 11, and thanks to the choice of providing a detachable coupling between the shafts 18, 19 and the rotors 2, 4, said rotors can be slid off easily from the respective shafts 18, 19 (by lifting them from above) in order to be able to remove them temporarily and proceed practically and easily to their periodic washing (or other cleaning and maintenance operations).

Moreover, the cover 12, the casing 8 and the grille 22 also can be removed easily and temporarily, sliding them off the footing 15 and/or the shafts 18, 19 (together with the rotors 2, 4 coupled thereto, and therefore in a single operation) in order to wash them, clean them or perform any other maintenance activity.

For this very purpose, as specified in the preceding pages, the casing 8 is arranged detachably with respect to the footing 15: by gripping and lifting the casing 8, in fact, and in a single operation (optionally after acting on safety retainers), the user can remove easily the casing 8 (and with it the cover 12 and the grille 22, coupled thereto), in addition to the rotors 2, 4 (as shown, in turn coupled to the casing 8 and removable from the shafts 18, 19) and perform the desired washing and cleaning activities.

The presence of the drawers 28, in which the peels E, the pips and the pulp can fall automatically, instead allows managing in an optimal manner this waste once juicing has occurred.

In practice it has been found that the juicing device according to the disclosure achieves fully the intended aim, since resorting to a transfer rotor that is provided externally with at least one seat for accommodating at least one portion of an agricultural product and to a juicing rotor that penetrates at least partially into the seat, during respective useful rotation portions, allows to provide a device capable of juicing agricultural products such as citrus fruits and the like in a practical and easy manner.

The disclosure thus conceived is susceptible of numerous modifications and variations; all the details may further be replaced with other technically equivalent elements.

For example, it is noted that it is possible to provide devices 1 according to the disclosure in which the lateral surface of the sector 11 is without discontinuities (and therefore without openings, microperforations, etc.). According to this solution, therefore, the liquid expelled from the portions B remains trapped in the interspace comprised between the useful sector 11 and the delimiting surface 9 of the seats 3; from the interspace, therefore, the liquid falls by gravity into the tank 21, at the same time being filtered by the grille 22, which frees it from the seeds, pulp and other solid waste.

In the exemplary embodiments shown, individual characteristics, given in relation to specific examples, may actually be interchanged with other different characteristics that exist in other exemplary embodiments.

In practice, the materials used, as well as the dimensions, may be any according to requirements and to the state of the art.

The disclosures in Italian Patent Application No. BO2013A000436 from which this application claims priority are incorporated herein by reference.

The invention claimed is:

1. A juicing device for agricultural products comprising:
at least one transfer rotor, which can rotate about a first rotation axis that is arranged vertically in use of the device, and which is provided externally with at least one seat for at least partial accommodation of at least one portion of an agricultural product, and
at least one juicing rotor, which can rotate about a second rotation axis, which is parallel to said first axis and arranged vertically in use of the device, during respective useful portions of the rotation of said at least one seat and of said juicing rotor wherein juicing occurs, said at least one juicing rotor penetrating at least partially in said at least one seat, for the juicing of the at least one portion of the agricultural product accommodated in said seat;
wherein said at least one transfer rotor is constituted substantially by a cylinder that is accommodated rotatably in at least one respective substantially cylindrical first chamber, which is open towards said juicing rotor, defined in a casing,
said transfer rotor having a plurality of axial slots distributed evenly along a lateral surface of the transfer rotor and run along an entire length of said cylinder,
each one of said slots having a substantially semi-cylindrical delimiting surface in order to define a respective one of said seats for accommodating a hemispherical portion of the agricultural product, cut beforehand, with a peel directed toward said delimiting surface and with a pulp, at a cutting area, directed outwardly
wherein said juicing rotor is constituted substantially by a prism-like body that has at least one useful sector of a lateral surface thereof that has a substantially cylindrical shape and is eccentric with respect to said second rotation axis, and at said useful portion said sector, which is at least partially perforated so as to define a plurality of filtering openings, entering a respective one of said seats, for the juicing of the hemispherical portion of the agricultural product.

2. The juicing device according to claim 1, wherein said casing comprises an upper cover, provided with an insertion component configured for inserting at least one portion of at least one agricultural product, and, on an opposite side, is arranged detachably on an upper face of a substantially box-like footing, which has a lower face that can be arranged on a resting surface,
a motor apparatus being accommodated inside said footing for a first rotating shaft and for a second rotating shaft, which are extended externally respectively along said first rotation axis and said second rotation axis, at right angles to said faces, to support correspondingly said transfer rotor and said juicing rotor, detachably coupled to said shafts.

3. The juicing device according to claim 2, wherein said casing is provided in a lower region with an internal tank, which rests against said upper face of said footing and is arranged below at least said juicing rotor, in order to collect the liquid expelled from the hemispherical portions of the agricultural products and filtered through said openings,
a contoured grille for further filtration of the expelled liquid being interposed between said rotors and said tank and being arranged above said tank and parallel thereto, along the bottom of said tank there being a manifold, which is connected to a liquid discharge duct, provided in a dispensing spout, which is optionally extractable and is directed outwardly.

4. The juicing device according to claim 2, wherein said box-like footing is provided externally with at least one recess, which is arranged below said transfer rotor at a return portion of said slots, which is subsequent to said useful portion during rotation about said first rotation axis,
at least one drawer for collecting peels and other waste, obtained as a consequence of the juicing of the hemispherical portions of the agricultural products, being accommodated detachably inside said at least one recess.

5. The juicing device according to claim 2, wherein said insertion component comprises at least one inlet that is shaped like an annular portion, provided in said upper cover, coaxially to said transfer rotor and facing at least one of said respective slots, at at least one angular feeding position, said at least one inlet being closable at least partially by at least one fan-shaped door, which rotates about said first rotation axis.

6. The juicing device according to claim 2, further comprising a blade configured for the automatic cutting of whole agricultural products in order to obtain the hemispherical portions.

7. The juicing device according to claim 6, further comprising two of said transfer rotors, at respective first loading positions,
each slot of one of said transfer rotors facing a corresponding said slot of the other one of said transfer rotors, for the temporary formation of a cylindrical channel for the insertion and accommodation of a substantially spherical whole agricultural product,
between said transfer rotors there being said blade, which runs parallel to said rotation axes and is directed toward said channel, and during the rotation of said seats toward said respective useful portions, the agricultural product being pushed by said transfer rotors toward said blade to cut it into two hemispherical portions.

8. The juicing device according to claim 7, wherein said upper cover has perimetric side walls to define a tank for storing whole agricultural products prior to their insertion in said channel, said insertion component comprising a chute, which is arranged on said cover and is inclined towards said channel, a lifting block being interposed between said partition and said chute and being movable on command between a first configuration, in which the top of said block is aligned with said chute, and a second configuration, in which said top is raised to a vertical level that is greater than the height of said partition, in order to allow the whole agricultural products loaded onto said top to move beyond said partition and fall into said channel, through an opening, which is laterally adjacent to said partition and aligned with said partition.

* * * * *